United States Patent [19]

Baumgartner et al.

[11] Patent Number: 5,388,803
[45] Date of Patent: Feb. 14, 1995

[54] APPARATUS FOR PRODUCING TEXTURED ARTICLES

[75] Inventors: Charles E. Baumgartner, Niskayona; Katherine D. Hamly, Clifton Park, both of N.Y.

[73] Assignee: General Electric Company, N.Y.

[21] Appl. No.: 108,025

[22] Filed: Aug. 17, 1993

[51] Int. Cl.⁶ ............................................. B28B 7/42
[52] U.S. Cl. ................................. 249/111; 249/114.1;
249/116; 249/134; 249/135; 264/106; 425/810
[58] Field of Search .................. 249/111, 114.1, 115,
249/116, 134, 135; 264/106; 425/810, 175

[56] References Cited

U.S. PATENT DOCUMENTS

| | | | |
|---|---|---|---|
| 3,734,449 | 5/1973 | Itou et al. | 249/114.1 |
| 3,745,096 | 7/1973 | Fournier | 249/115 |
| 4,037,646 | 7/1977 | Hara et al. | 249/116 |
| 4,225,109 | 9/1980 | Yotsutsuji et al. | 249/111 |
| 4,238,179 | 12/1980 | Llabres et al. | 425/810 |
| 4,670,479 | 8/1986 | Mijiauchi . | |
| 4,723,903 | 2/1988 | Okazaki et al. | 425/810 |
| 4,734,488 | 3/1988 | Hasuo et al. . | |
| 4,774,315 | 9/1988 | Miller . | |
| 4,902,735 | 2/1990 | Okamuto et al. . | |
| 4,977,233 | 12/1990 | Okamuto et al. . | |
| 4,997,903 | 3/1991 | Okamuto . | |
| 5,041,247 | 8/1991 | Kim | 249/116 |
| 5,176,839 | 1/1993 | Kim | 249/111 |

FOREIGN PATENT DOCUMENTS

| | | | |
|---|---|---|---|
| 51-80358 | 7/1976 | Japan | 249/116 |
| 62-207358 | 9/1987 | Japan . | |
| 62-208919 | 9/1987 | Japan | 249/135 |

*Primary Examiner*—Charles S. Bushey

[57] ABSTRACT

A multilayered insulated mold structure for forming textured articles is disclosed. An insulation layer is deposited on the mold core and a multilayered skin layer is deposited on the insulation layer. The skin is formed of a plurality of sublayers, including a corrosion-resistant phosphorous-rich nickel region on the insulation layer acting as an etchant stop, and an non-corrosion resistant, or etchable, phosphorous-poor nickel region on the corrosion-resistant layer. The upper layer is uniformly textured by selective etching down to a depth terminating at the interface between the layers, but the insulation layer is protected. A method of molding uniformly textured articles is also disclosed, as is a method of making a mold suitable for producing uniformly textured articles and a method for making such a mold surface having bulk imperfections.

10 Claims, 4 Drawing Sheets

APPARATUS FOR PRODUCING TEXTURED ARTICLES

BACKGROUND OF THE INVENTION

The present invention relates generally to molds for producing textured articles and more particularly to insulated molds with a selectively etchable multilayered top layer for uniformly texturing molded articles.

Molding of thermoplastic resins is a promising technique for producing relatively thin, wide and strong plastic parts such as panels for use in automobiles or appliances. Depending on specific requirements, such plastic parts can be made by any of a number of molding processes such as blow molding, injection molding with cold or hot runners and with gas assist, and compression molding.

Blow molding involves the extrusion of a molten tube of resin called a parison into a mold. The mold closes around the parison, pinching the bottom of the parison closed. A gas such as air is then introduced causing the tube to expand against the cool surfaces of the mold. When the parison comes into contact with the cool mold surface, the plastic at the surface quickly freezes. This results in surface imperfections such as die lines, fold lines, pores and voids.

Injection molding involves injecting molten thermoplastic resin into a mold apparatus. Molds for injection molding of thermoplastic resin are usually made from metal material such as iron, steel, stainless steel, aluminum alloy or brass. Such materials are advantageous in that they have high thermal conductivity and thus allow the melt of thermoplastic resin to cool rapidly and shorten the molding cycle time. However, because of the rapid cooling, the injected resin freezes instantaneously at the mold surface, resulting in a thin solid layer. Quick quenching of the melt at the mold surface creates several problems, particularly when molding resins which contain large amounts of fillers in the form of fibers and powders. The freezing of these materials at the mold surfaces creates rough surfaces such as exposed fillers, voids and porosity. Processing difficulties arise when producing thin, large parts. The quick solidification of the melt combined with limited flowability of the materials makes it difficult to achieve melt flow over a large area. The use of multiple gates for large and/or complex mold cavities produces weld lines, which are unsightly and weak. Another important issue in injection molding of high quality parts is the residual stresses in the molded parts. Residual stress inside a part can result in dimensional instability over the lifetime of the part. Non-uniform residual stresses also produce differential refractive indices. The dimensional stability and uniformity of refractive indices are critically required for high quality parts.

Compression molding processes of glass reinforced thermoplastic sheets begin with heating the composite blanks. The material is heated above its melting point or if an amorphous material at least substantially above its glass transition temperature. When the composite blanks are heated, they expand (loft) due to the recoil forces within the fibers. The hot blanks are then pressed between cool mold surfaces which are below the melting point or glass transition temperature (typically 175°-250° F.). Contact with the cool mold surfaces results in frozen resin on the surface of the blank. This creates unfilled areas in the form of exposed fibers and surface porosity. Since the resin at the cold surface is frozen and does not flow, rough boundaries between the charged and newly formed areas are produced.

In injection compression molding which is a combined process, a hot thermoplastic melt is injected into a mold cavity. The parting line of the mold is positioned open or allowed to be forced open by the injected melt typically 0.05" to 0.3" inches. The clamping force is increased initiating the compression stroke of the mold forcing the melt to fill the cavity. In many instances the velocity of the melt front through the cavity changes as the injection stroke stops and the compression stroke begins. This distinct change in melt front velocity is often characterized by a stall followed by a surge in the melt front.

The melt begins to quench on the cavity walls as it is injected into the mold. As the melt front stalls, at the completion of injection, and then surges forward, upon the initiation of compression, a blemish, sometimes referred to as a halo, may be produced in the surface of the molded article. The blemish is the result of differential cooling and shear stress which occurs in the injection compression process as a result of the melt front velocity change.

There have recently been disclosed multilayer molds in which a metal core has an insulating layer bonded thereto, for the purpose of slowing the initial cooling of the resin during the molding operation. The insulating layer is fabricated of material having low thermal conductivity, thus slowing the cooling of the molten resin, and also having good resistance to high temperature degradation, permitting use in a mold maintained at high temperatures. Said layer may be made of a resin such as polyimide, polyamideimide, polyethersulfone or polyetherketone, typically applied in uncured form (e.g., as a polyamic acid in the case of a polyimide or polyamideimide) and subsequently cured. Cured resins in a solvent carrier may also be employed.

One important requisite for the use of molded plastic parts in large, exterior panel applications is a finished surface quality. The surface of molded plastic parts should be as finished as that of current exterior parts made from sheet metal. Improved surface quality of molded plastic parts has been achieved by means of molds in which a polymeric insulating layer is disposed on the mold core and a durable thin skin metal layer is disposed on the insulating layer. Due to the insulation, the skin layer retains heat during the molding operation, thereby avoiding the surface irregularities created by rapid surface cooling. Thus, these devices provide a finished surface while maintaining a relatively short cycle time.

Exemplary insulated molds have an insulating layer of about 0.01 inch and a corrosion-resistant nickel outer skin. The application of the insulating layer involves spraying the polymer in a solvent solution and drying. This is repeated until the final desired coating thickness has been achieved after which a layer of Ni is electro deposited or applied electrolessly.

Particularly advantageous multilayer mold structures have been produced in which the mold is first coated with a thermal insulator, such as polyamideimide, and then overcoated with one or more layers of an abrasion-resistant metal such as electroless nickel. In some instances the outer layer of the polymer has a porous primer layer formed of a matrix of nickel particles suspended in the polymer to promote durability of the mold and to promote adhesion of the nickel skin layer.

In a conventional mold, a texture such as leather grain, is created by selectively etching the pattern into the steel mold cavity. Textured depths typically vary from about 0.0004 inches to as deep as 0.01 inches. During the coating process the insulator flows a small amount, washing out the texture in the steel mold cavity, thereby resulting in an unacceptable texture which is not sharp. Thus, it is necessary to etch the mold surface layer in order to achieve good texture definition.

The multilayer structure presents at least two significant problems. First, it is known in the art that the durable skin layer usually formed of high phosphorous nickel (P>8%) is difficult to etch, and results in non-uniform removal of material. Thus, it is not done commercially. Also, the resists used in the industry will not survive the strong chemical etchants required. Secondly, the etchant used in texturing may not be allowed to penetrate to the insulating layer, especially a nickel filled layer. If penetration occurs, the etchant attacks the nickel particles and the polymer, resulting in delamination between the nickel skin and the insulator. To use such a technique would then therefore risk a catastrophic failure of the mold, requiring reprocessing, which is expensive and time-consuming. There thus exists no acceptable method for texturing the molds to produce acceptable textured articles. Accordingly, a high quality, reproducible textured mold having an insulating layer, and a durable mold surface producing finished molded articles is desired.

SUMMARY OF THE INVENTION

The present invention is based on the discovery that a differently etchable multilayered outer skin may be employed in a mold to achieve a reproducible, abrasion-resistant and sharp-textured mold surface to a controlled depth.

Broadly described, the invention comprises a mold having a structure comprising:
a core;
an insulating layer bonded to the core; and
a skin layer bonded to the insulating layer, being formed of a plurality of selectively etchable layers including a first layer of a corrosion-resistant material and as second, overlying layer of a non-corrosion resistant material.

In an exemplary embodiment, a first phosphorous-rich nickel layer (e.g., P>8%) is formed on the insulating layer, which is sufficiently thick (e.g., 0.001 inches) to resist abrasion and attack by chemical agents. A second outer layer of low phosphorous or phosphorous-poor nickel (e.g., P<5%) is deposited on the first layer to a thickness equal to the texture depth required (e.g., 0.001 to 0.005). A mask or resist is applied to the mold, and the unmasked regions are exposed to an etchant and are eroded. An etch rate in the low phosphorous nickel layer of about 0.004 inches per hour is achievable while the etch rate in the high phosphorous nickel layer is negligible. The high phosphorous nickel acts as an etchant stop preventing further material removal in the exposed areas, thereby protecting the insulation layer. An optional overcoat of durable high phosphorous nickel may be deposited on the etched surface to protect the mold surface.

In addition to protecting the polymer layer, the invention provides a reproducible, uniform depth, abrasion-resistant coating capable of surviving injection mold pressures with glass-filled resins.

The invention is also directed to a method for molding thermoplastic materials having a finished textured surface comprising charging a molten thermoplastic material into a mold having the aforementioned structure. Retaining the material in the mold until its temperature falls below the glass transition temperature, and thereafter ejecting the article from the mold.

The invention is also directed to an article manufactured in such a mold, having a uniformly finished textured surface.

Yet another aspect of the invention is to a method for making a mold surface particularly suitable for manufacturing textured surfaces on molded articles comprising the steps of depositing a corrosion resistant bottom layer on the mold; depositing a non-corrosion resistant top layer on the bottom layer etching the non-corrosion resistant top layer of said mold surface to form a textured surface to a controlled depth terminating at the corrosion resistant lower surface which is not affected the etch step, so that the texture in the mold surface is limited to a uniform depth.

It is to be understood that, if desired, the multilayer mold surface of the present invention may be employed directly onto a repaired mold core without an insulating layer therebetween for improving texturing capabilities of conventional non-insulated molds.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof may best be understood by reference to the following description taken in conjunction with the accompanying drawing figures in which:

DESCRIPTION OF THE INVENTION

Figure 1:
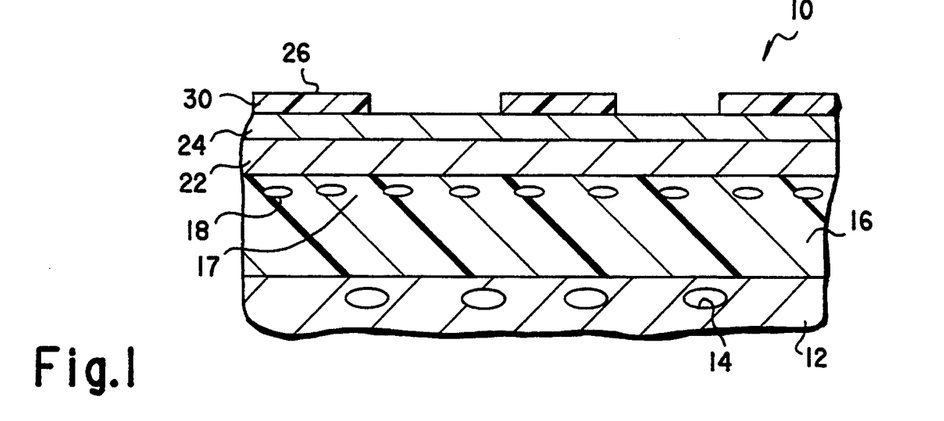
FIG. 1 is a fragmentary side sectional elevation of an embodiment of the mold structure prior to etching having an etch mask deposited thereon.

Referring now to the drawings wherein like numerals indicate like elements throughout, FIG. 1 shows a partial side elevation of a multilayer mold 10 of the present invention prior to etching to achieve texturing. The mold 10 comprises a substrate or core 12 of high thermally conductive material. Cooling lines 14, such as copper pipes, are provided in the core 12 for receiving a cooling fluid to reduce cycle time. The core 12 is covered by a thin thermal insulating layer 16. The thermal insulating layer 16 can be fabricated from low thermally conductive material such as high temperature thermoplastics, thermosets, plastic composites, porous metals, ceramics low-conductivity metal alloys and polymeric materials such polyimides, fluorinated polyamides and polyamideimides. Other low thermally conductive materials used for insulation could also be used. The insulating layer 16 may optionally be a porous matrix of polymeric material 17 and incorporate therein filamentary nickel particles 18. The insulating layer 16 is often not mechanically strong or durable and cannot produce surfaces of high quality when used as a mold surface in an injection molding apparatus. Accordingly, a thin hard skin layer is bonded to the insulating layer 16. The skin layer must exhibit a number of desired properties. These properties include strong adhesion between the skin layer and the insulating layer 16, good abrasion resistance and high mechanical strength. In addition, the skin layer must be uniformly etchable to a degree sufficient to produce a finished textured article, and the skin layer must at the same time be sufficiently etch-resistant to protect the insulating layer 16. Other important properties include thermal conductivity and oxidation resistance.

To achieve these properties, the hard skin layer is fashioned from a plurality of sublayers which contribute one or more of the desired properties. In a preferred embodiment, the skin layer comprises at least two sublayers, namely a hard inner or sublayer 22 and etchable upper layer 24. The upper layer 24 is preferentially etchable relative to the inner layer 22. The hard sublayer 22 is first disposed directly onto the insulating layer 16. This first, inner layer 22 is made of material which exhibits good adhesion strength as well as thermal conductivity and oxidation resistance. This layer when employed with a metal filled porous insulating layer 16 penetrates deeply therein and forms mechanical and metallic bonds for increased adhesion.

Of particular importance, however, is that the inner layer 22 be highly resistant to chemical etchants to protect the insulation layer 16 and to establish an etchant stop. An example of such material is Enthone electroless nickel 425. The material has a relatively high phosphorus content (e.g., P>8%).

The upper layer 24 is deposited on the inner layer 22. The upper layer 24 must provide a high degree of mechanical strength and thermal conductivity. Of particular importance, however, is that the upper layer 24 must be non-corrosion resistant to the chemical etchants so that a textured surface can be produced. An example of a preferred material for the upper layer 24 is ENTHONE electroless nickel 426. The material has a relatively low phosphorus content (e.g., P<5%). Ideally, the inner layer 22 is 1 to 25 microns in thickness, and the outer layer 24 is sufficiently thick to enhance the mechanical strength and to produce the depth necessary to sustain the desired texture.

A removable masking layer 26 is deposited in a pattern atop the upper layer 24. The masking layer 26 selectively exposes etch areas and protects the covered or masked areas 30.

The result of these various layers is a thin skin layer which may be selectively etched to a selected depth without damaging the underlying insulation layer 16. The upper molding surface is smooth, hard and has good adhesion strength, structural integrity and abrasion resistance. The insulating layer 16 and the hard skin layer can be applied, for example, by lamination, deposition or sintering. The high conductivity core 12 provides good heat transfer to and from the insulating layer 16. The core 12 is cooled by cooling passages 14 which carry cooling fluid through the core. The core 12 can be made from any adequate material such as steel, aluminum, ceramics, glass or plastic composite materials. The core does not normally come into contact with the material being molded, therefore it is not subject to wear by such material.

The insulating layer 16 preferably comprises a film of a polyimide resin available under the trademark EYMYD from the Ethyl Corporation, a film of EYMYD polyimide combined with one of several particulate fillers such as glass, $AlSiO_3$, $BaSO_4$, $Al_2O_3$, etc., or a layer of filled EYMYD coated with a layer of non-filled EYMYD polyimide. However, the insulating layer 16 can be made from any material with an adequately low thermal conductivity, such as high temperature thermoplastics, thermosets, plastic composites, porous metals, ceramics and low-conductivity metal alloys.

Figure 2:
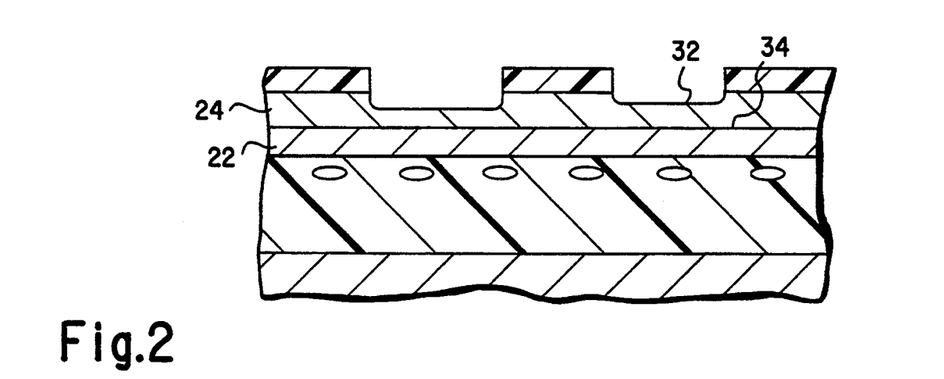
FIG. 2 is a fragmentary side sectional elevation of the mold structure shown in FIG. 1 during the etching step.

FIG. 2 illustrates the etching process, wherein the phosphorus-poor region 24 is etched in areas 28 when exposed to the etchant, producing texturing areas 32. When the etching solution reaches the interface 34 between the phosphorus-poor region and the phosphorus-rich region 22, the etching process effectively terminates. The depth D of the etched texturing regions 32 corresponds to the thickness of the phosphorus-poor layer 24.

Figure 3:
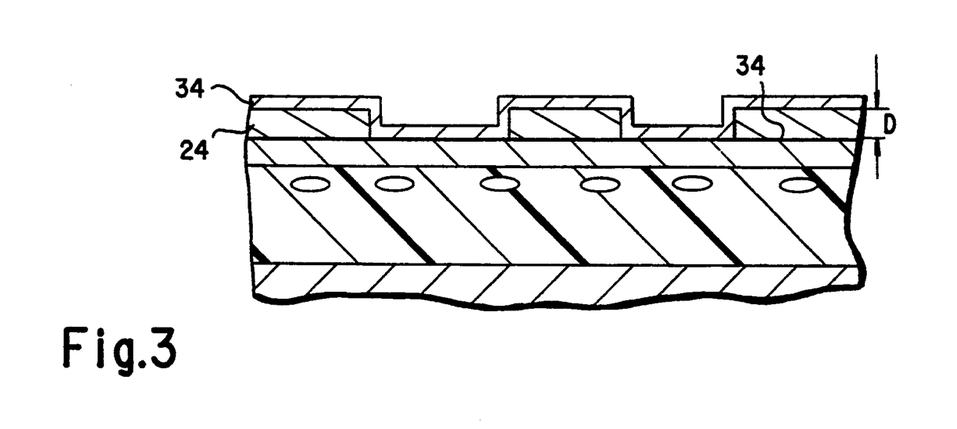
FIG. 3 is a fragmentary side sectional elevation of the mold structure of FIG. 1 at the completion of the etching step with the mask removed and an optional durable coating applied thereon.

FIG. 3 illustrates the finished texturing areas 32 etched to the control depth D. The masking material has been removed. A hard protective layer of electroless nickel 34 is deposited over the upper layer 24 as shown and discussed hereinafter.

Figure 4:
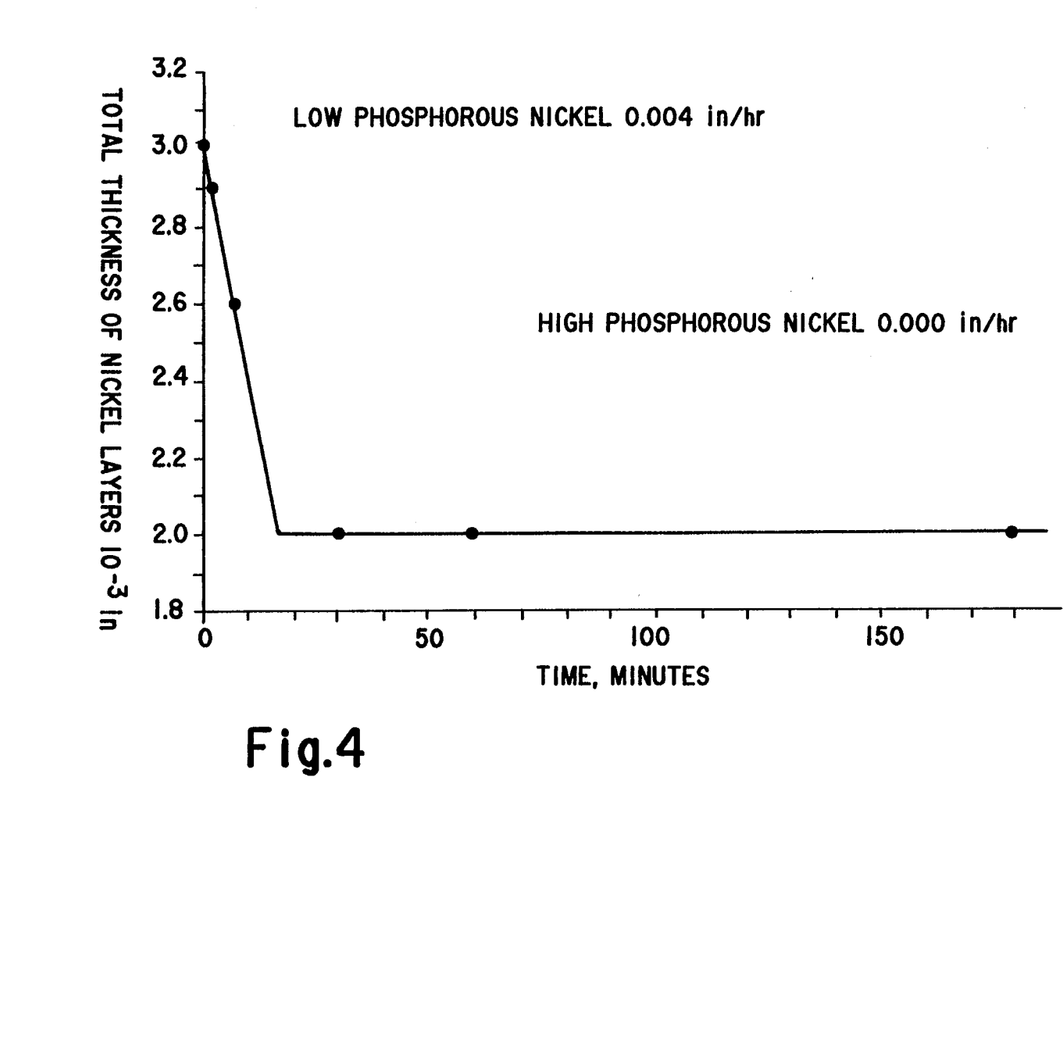
FIG. 4 is a graph of the etch rate versus time for a multilayer mold surface in accordance with the present invention.

FIG. 4 shows the etch rate for the phosphorus-poor region 24 and the phosphorus-rich region 22. A 0.002 inch etch is achieved in about the first 20 minutes without further etching in the phosphorus-rich region 22 after three additional hours exposure to etchant. Thus, a reliable, uniform etch depth can be achieved without risking damage to the underlying insulation layer 16.

In an alternative embodiment, a highly durable electroless nickel coating 36 may be deposited on the etched surface to protect the phosphorus-poor region and to impart extra strength and durability to the mold surface. The overcoating 34 may be deposited on the mold surface by any one of a variety of techniques, including electroless nickel deposition.

In operation, as shown in FIG. 4, when a hot resin is placed in the mold 10 structure. Upon contacting the skin layer, the hot resin heats the skin layer to a temperature which is above the glass transition temperature, $T_g$. The insulating layer 16 causes the temperature of the skin layer to remain above the glass transition temperature for the duration of the molding process, i.e., for a time sufficient to allow the resin to fill the mold cavity and the texturing areas 32 without freezing. Consequently, the resin flows freely during molding and smooth surfaces result. The freely flowing resin not only flows across the upper portions of the skin layer, but also flows into the etched texturing areas 32, forming a mirror image of the textured surface of the mold, which image is sharply defined by the etched areas 32.

From the foregoing description, it will be seen that the present invention provides an improved molding apparatus for producing uniformly textured finished molded articles, which is applicable to many types of molding processes including injection, compression and blow molding. Existing molding devices can be easily adapted to incorporate the present invention without great effort or expense.

An example of a mold surface formed in accordance with the present invention is discussed below with respect FIGS. 1-3. The phosphorus-rich layer 22 may be an electroless nickel EN425 by Enthone containing about 11–13% phosphorus, which need only be as thick as needed for abrasion resistance in molding, typically 0.001 inches. The phosphorus-poor region 24 is ENTHONE EN426 containing about 3–4% phosphorus, plated to a thickness equal to the texture depth required (for example, about 0.5 to about 8 mils, and preferably 0.5 to about 4 mils). The masking or resist 26 is applied to the mold surface. Suitable materials include a Scotch brand tape core series 2-0300 from 3M Corporation. Mold Tech, of Chicopee, Mass. performs mask and etch services using a wax based material on a contract basis as well. The article is subjected to an etchant such as ENSTRIP 110 etchant by Enthone. The etch rate is about 0.004 inches per hour. Under the same conditions, the etch rate of the material in the phosphorus-rich region 22 is negligible, e.g., less than 0.1 mil per hour. The phosphorus-rich layer 22 acts as an etchant stop at the interface 34 and prevents further material removal in the exposed areas. In addition to protecting the insulation layer 16 which may contain nickel filling particles 18, the uniform depth abrasion-resistant surface containing the texture is capable of surviving injection molding with glass-filled resins.

A sample composed of stainless steel plated with 0.002 inches of EN425 high phosphorus nickel and subsequently plated with 0.001 inches of EN426 low phosphorus nickel was collectively masked in regions and etched with ENSTRIP 110 etchant (60 g/l>95% sulfamic acid, 20 volume % 50% $H_2O_2$, 8 volume %>90% $H_2O$ with less than 10% ammonium nitride and 1% ammonium chloride) heated to 50° C. The etchant had a final composition of 60 g/l sulfamic acid, about 25% $H_2O_2$; less than 0.8% aluminum nitrate; about 0.08% aluminum chloride; and about 74% $H_2O$. Various exposure times were used, and are plotted in FIG. 4. A removal rate of 0.004 inches per hour was observed for the low phosphorus nickel. Upon exposure to the highest phosphorus nickel, the removal rate dropped to less than 0.1 mil/hr.

A similar mold having a polymer insulating layer 16 was electrolessly plated with 0.002 inches of high phosphorus nickel (EN425), and electroplated with 0.005 inches of sulfamate nickel. The multilayer material was textured and thereafter electrolessly plated with EN425 high phosphorus nickel for additional abrasion resistance.

In addition to the foregoing, other chemical agents of various kinds may be employed. For example, a 35% $HNO_3$, 20° C. with various additions such as nickel acetate, potassiumnitrate, sodium fluoride, potassium chloride and cobalt sulfate are available. Also useful are various nitric acid solutions including 14–70% $HNO_3$ at 20° C. to about 45° C.; 21% $HNO_3$ with 0–9% $H_2O_2$ and 75% phosphoric acid at bout 45° C. Other materials include thionyl chloride, orthochlorobenzyl chloride, benzotrichloride, benzoyl chloride, phosphorus oxychloride and sodiumhydroxide about 45% to about 75% with 5% NaCl.

Experimental materials include a mixture of 20% $HNO_3$, 16% HCl and 64% $H_2O$ at room temperature and a mixture of 15% $H_2SO_4$, 40 g/l aluminum nitride, 10 g/l sulfamic acid and balance $H_2O$ at 30° C.

Etchants of interest include 50% (volume) $HNO_3$ and 50% $H_2O$ at 15° C.; and 25% $HNO_3$, 20% HCl and 55% $H_2O$ at 20° C.

Another etchant solution may comprise EN86 by Enthone or a mixture of ENSTRIP NP-1 etchant 20% by volume, NP-2 20% by volume and $H_2O$ 60% by volume having a room temperature pH of about 12.0.

If the multilayer structure is applied to a conventional non-insulated repaired mold, benefits are achieved because the texture would be incorporated into the nickel layers, and discontinuities in the steel such as sulphur streaks, hardness variation, surface structure orientation and variation, and stress arising from the repairing processes to which the mold has been exposed, would not affect the quality of the resulting texture. In addition, the multilayer coating would eliminate discontinuity resulting from the repairs to such molds which may have been altered due to welding, including the heat-affected zone (HAZ), as well as the weld itself. In addition, because the nickel layers are abrasion-resistant, the necessity to surface harden the mold would be eliminated. Rough etching resulting from molds cut from cast material would also be eliminated. Finally, if the texture on the mold is to be changed, the outer nickel layer could be simply removed by etching without significantly affecting the high-phosphorus region. As a result, the application of the two nickel layers would result in a texturing process which is independent of the mold material. For example, as noted above, in a conventional mold the multilayer molding surface virtually eliminates defects in the texturing which result from imperfections in the repaired mold.

The present invention is therefore beneficial for both insulated and non-insulated repaired molds. In an insulated mold, the multilayer nickel coating not only produces texturing of uniform depth but also protects the delicate underlying polymer coating.

According to the invention, various thermoplastic materials may be employed with the mold to produce finished products. Such plastics include polyamide materials sold under the trade designation "Nylon 6" or "Nylon 12" or "Nylon 6,6"; and other polymers such as polyesters, such as poly (butylene terephthalate) (PBT), poly (ethylene terephthalate) (PET), and PBT with soft ether linkages formed of polycarbonate and methylene, polyether ketones, polyetherimides, polylactams, polypropylenes, polyethylenes, polystyrene, styrene acrylonitrile, acrylonitrile butadiene terpolymers, polyphenylene oxide (PPO)/polystyrene and PPO/nylon and high impact styrenes filled or unfilled and blends thereof. Materials particularly suited for use in the invention, because of their versatility, strength and appearance include filled or unfilled polycarbonates, polyesters, polyphenylene oxide, acrylonitrile butidiene styrene (ABS), polyimide and polymeric combinations of such materials.

In addition to the foregoing, the following patents, the teachings of which are incorporated herein by reference disclose materials particularly useful for molding optical media such as optical disks and compact disks, and business machine parts which require optimum surface properties: Mille, U.S. Pat. Nos. 4,774,315 and 4,788,275; Okamuto, U.S. Pat. No. 4,997,903, Okamuto et al., U.S. Pat. Nos. 4,977,233 and 4,902,735; Hasuo et al., 4,734,488; Myiauchi, U.S. Pat. No. 4,670,479 and Japanese Patent J62207-358-A. These references disclose various materials having an average molecular weight within the range from about 10,000 and about 18,000 suitable for the molding applications herein discussed as well as other applications of interest to those skilled in the art.

The process according to the present invention is directed to the use of a mold as described herein for making molded thermoplastic articles. In particular, the mold may be employed in an injection molding or injection compression molding process where molten thermoplastic material is injected into a mold cavity. The molten material spreads throughout the cavity and is held therein for a time sufficient to cool below the glass transition temperature after which the molded article is ejected. In compression/injection molding, the molten thermoplastic material is compressed after the injection step. The invention results in molded articles having less severe and more uniform birefringence, less stress, a smoother surface finish and better optical properties.

Figure 5A:
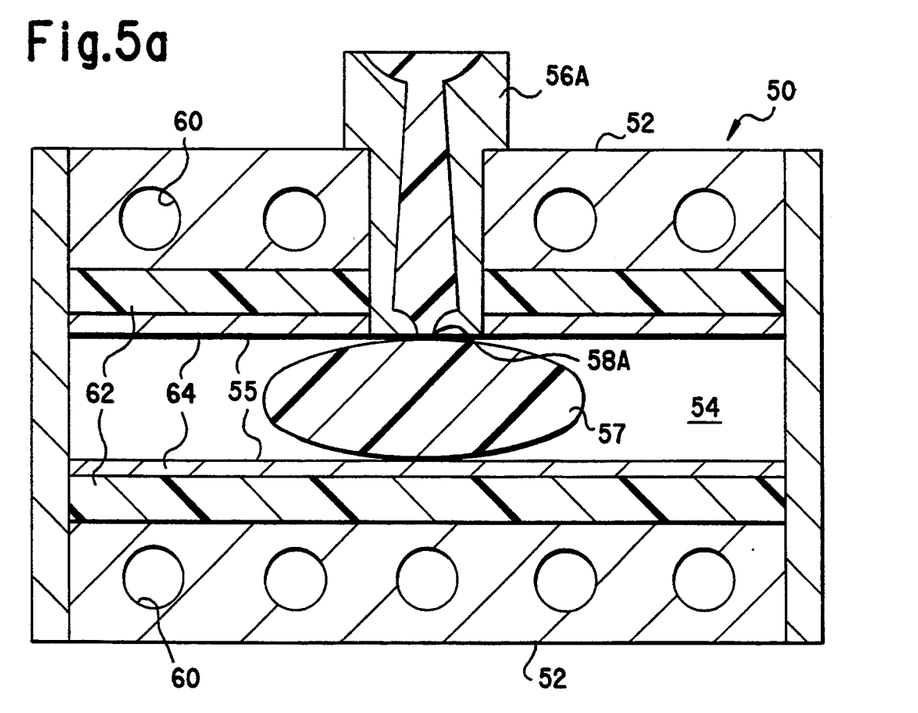
FIGS. 5A and 5B are respective fragmentary schematic end and side sectional illustrations of an injection compression molding apparatus with one or more gates employing insulated molds according to the invention.
Figure 5B:
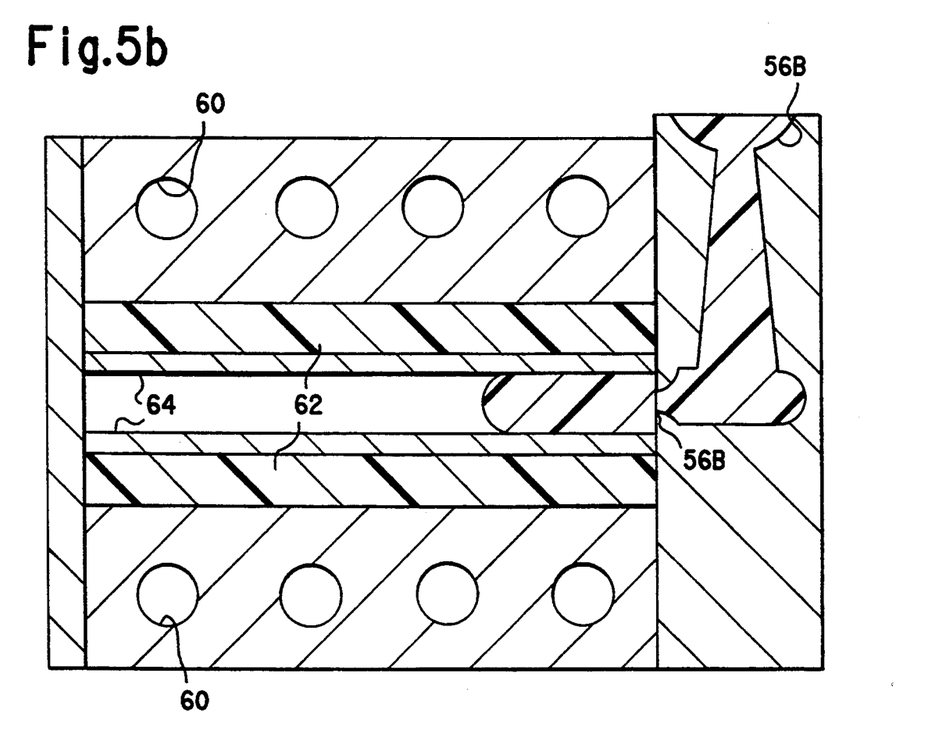

Referring now to the drawings where like numerals indicate like elements throughout. FIGS. 5A and 5B show a multilayer mold 50 of the present invention. While the attributes of the present invention are applicable to many types of molding, an injection compression molding apparatus is illustrated in the drawings. The mold 50 comprises two core halves 52 relatively moveable with respect to each other and situated in opposing or confronting relationship so as to form a mold cavity 54 therebetween. The mold 50 has at least one textured surface 55 formed in accordance with the teachings of the invention. Hot thermoplastic resin 57 is injected from a source (not shown) in the mold cavity 54 via a top sprue 56A and a top gate 58A (FIG. 5A), or an end sprue 56B and end gate 58B (FIG. 5B) or both. After the injection step, the mold halves 12 may be moved relative to each other to further compress and spread the thermoplastic material in the cavity 14. The mold halves 52 are made of a material with a relatively high thermal conductivity such as iron, steel, stainless steel, aluminum alloy or brass. Cooling lines 60 for receiving a cooling fluid are provided in the core halves to reduce cycle time. A thermal insulating layer 62 is disposed on each of the core halves 52. The thermal insulating layer 62 is ideally made from a low thermally conductive material such as high temperature thermoplastics, thermosets, plastic composites, porous metals, ceramics and low-conductivity metal alloys.

Other low thermally conductive materials used for insulation could also be used. Preferably, the insulating layer 62 is made of a resin such as polyimide, polyamideimide, polyethersulfone or polyetherketone, typically applied in uncured form (e.g., as a polyamic acid in the case of a polyimide or polyamideimide) and subsequently heat cured.

A multilayer hard skin layer 64, similar to the skin layer referred to hereinafter, is applied over the insulating layer 62 to protect the insulating layer. After texturing, according to the invention, the skin layer 64 provides the desired surface finish.

In operation, as the hot thermoplastic resin 11 is injected into (and if desired, compressed in) the mold cavity 54, heat from the resin is absorbed by the skin layer 64. The insulating layer 62 not only prevents quick cooling of the resin but causes the skin layer to reheat. This results in a hot plastic surface for a short time period. The hard skin layer provides the desired surface quality to the finished part. The part is held in the mold for a time sufficient to cool below the glass transition temperature of the resin and is then ejected.

Figure 6:
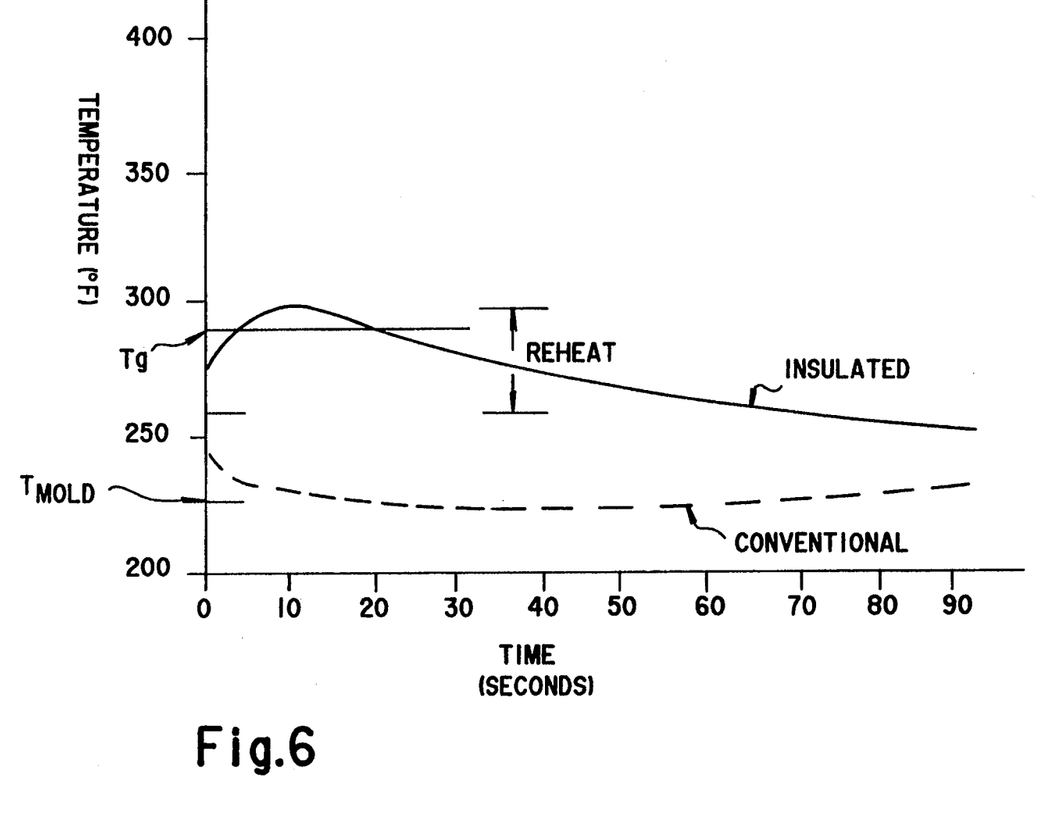
FIG. 6 is a comparative plot schematically showing the time temperature relationship of a thermoplastic material relative to the glass transition temperature $T_g$ in a conventional mold and in a mold according to the present invention.

FIG. 6 schematically shows the transient temperature response of the surface temperature of an article molded in accordance with the teachings of the present invention, in comparison to the temperature profile of an article manufactured by conventional processes. In conventional molding represented by the dotted line the thermoplastic material at time t=0 initially comes in contact with the mold surface. As can be seen, the thermoplastic material in conventional apparatus, without insulation, is immediately cooled below the glass transition temperature $T_g$. Such rapid cooling can cause rough surfaces in the finished article. On the other hand, with the insulated mold structure of the present invention, the thermoplastic material can be initially quenched by contact with the relatively cool skin of the mold and may temporally fall below the glass temperature $T_g$. However, the surface becomes reheated by the internal temperature of the hot molten thermoplastic material. Thus, the surface temperature increases to above the glass transition temperature, and the resin not only fills the mold thereby avoiding rough surfaces it fills the textured areas 32 (FIG. 3) formed in accordance with the invention to provide a sharp textured surface to the molded article.

While there have been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed:

1. A multilayer mold for molding thermoplastic into finished parts with uniform texturing comprising:
    a core;
    an insulating layer bonded to said core for slowing initial cooling of the thermoplastic during molding; and
    a skin layer bonded to the core, said skin layer being formed from a plurality of layers, including a corrosion-resistant layer, which is a phosphorus-rich region, deposited on the core and an etchable non-corrosion resistant layer deposited on the corrosion-resistant layer, said noon-corrosion resistant layer having been selectively etched to a uniform depth for imparting a finished textured surface to the thermoplastic.

2. The mold of claim 1, wherein the phosphorus-rich region has at least 8% phosphorus.

3. The mold of claim 1, further comprising a abrasion-resistant overcoat deposited over the uniformly textured mold surface.

4. A multilayer mold for molding thermoplastic into finished parts with uniform texturing comprising:
    a core;
    an insulating layer bonded to said core for slowing initial cooling of the thermoplastic during molding; and
    a skin layer bonded to the core, said skin layer being formed from a plurality of layers, including a corrosion-resistant layer deposited on the core and an etchable non-corrosion resistant layer which is a phosphorus-poor region, deposited on the corrosion-resistant layer, said non-corrosion resistant layer having been selectively etched to a uniform depth for imparting a finished textured surface to the thermoplastic.

5. The mold of claim 4, wherein the phosphorus-poor region contains up to about 5% phosphorus.

6. A multilayer mold of for molding thermoplastic into finished parts with uniform texturing comprising:
   a core;
   an insulating layer bonded to said core for slowing initial cooling of the thermoplastic during molding;
   a skin layer bonded to the core, said skin layer being formed from a plurality of layers, including a corrosion-resistant layer deposited on the core and an etchable non-corrosion resistant layer deposited on the corrosion-resistant layer, said non-corrosion resistant layer having been selectively etched to a uniform depth for imparting a finished textured surface to the thermoplastic; and
   an overcoat comprising a high phosphorus electroless nickel coating.

7. A multilayer mold for molding thermoplastic into finished parts with uniform texturing comprising:
   a core;
   an insulating layer bonded to said core for slowing initial cooling of the thermoplastic during molding;
   a skin layer bonded to the core, said skin layer being formed from a plurality of layers, including a corrosion-resistant layer deposited on the core and an etchable non-corrosion resistant layer deposited on the corrosion-resistant layer, said non-corrosion resistant layer having been selectively etched to a uniform depth for imparting a finished textured surface to the thermoplastic, wherein the insulating layer comprises a porous matrix filled with a material having an affinity for the skin layer.

8. The mold of claim 7 wherein the material having an affinity to the skin layer comprises filamentary nickel particles.

9. A mold particularly suitable for making uniformly textured surfaces in thermoplastic articles comprising a multilayer skin layer deposited on a substrate having bulk imperfections resulting from repairs made thereto, said skin layer, including a corrosion-resistant sublayer, which is a phosphorus-rich region, adjacent the substrate which is resistant to an etchant and a non-corrosion resistant layer deposited on the sublayer, said corrosion-resistant sublayer being unaffected by the etchant such that the non-corrosion resistant layer is etched to a uniform depth terminating at said corrosion-resistant sublayer.

10. A multilayer mold for molding thermoplastic into finished parts with uniform texturing comprising:
    a core having bulk imperfections resulting from repairs thereto;
    a skin layer bonded to the core, said skin layer being formed from plurality of layers, including a corrosion-resistant layer deposited on the core and an etchable non-corrosion resistant layer deposited on the corrosion-resistant layer, said non-corrosion resistant layer having been selectively etched to a uniform depth for imparting a finished texture surface to the thermoplastic and
    an overcoat comprising a high phosphorus electroless nickel coating.

* * * * *